US009072283B2

(12) United States Patent
Lee

(10) Patent No.: US 9,072,283 B2
(45) Date of Patent: Jul. 7, 2015

(54) ROTATABLE FISH HOOK

(76) Inventor: Young Jae Lee, Fullerton, CA (US)

(*) Notice: Subject to any disclaimer, the term of this patent is extended or adjusted under 35 U.S.C. 154(b) by 1030 days.

(21) Appl. No.: 12/356,529

(22) Filed: Jan. 20, 2009

(65) Prior Publication Data

US 2010/0154286 A1 Jun. 24, 2010

Related U.S. Application Data

(60) Provisional application No. 61/139,558, filed on Dec. 20, 2008.

(51) Int. Cl.
*A01K 83/00* (2006.01)

(52) U.S. Cl.
CPC ........................ *A01K 83/00* (2013.01)

(58) Field of Classification Search
CPC ...................................... A01K 83/00
USPC ............ 43/43.16, 44.82; 294/82.1, 66.1, 86.4
See application file for complete search history.

(56) References Cited

U.S. PATENT DOCUMENTS

| | | | | | |
|---|---|---|---|---|---|
| 289,508 | A | * | 12/1883 | Dawson | 43/44.82 |
| 539,149 | A | * | 5/1895 | Shattuck | 43/43.4 |
| 657,387 | A | * | 9/1900 | Bew | 43/35 |
| 664,476 | A | * | 12/1900 | Hall | 43/42.17 |
| 681,733 | A | * | 9/1901 | Rasmussen | 294/66.1 |
| 726,826 | A | * | 4/1903 | Rasmussen | 294/66.1 |
| 989,392 | A | * | 4/1911 | Mueller | 43/44.82 |
| 1,258,023 | A | * | 3/1918 | Landfried | 43/96 |
| 1,334,839 | A | * | 3/1920 | Cole | 43/44.82 |
| 1,495,927 | A | * | 5/1924 | Roland | 43/42.17 |
| 1,572,390 | A | * | 2/1926 | Keim | 294/82.1 |
| 1,723,193 | A | * | 8/1929 | McLaughlin | 43/42.22 |
| 1,869,111 | A | * | 7/1932 | McLaughlin | 43/42.41 |
| 1,922,386 | A | * | 8/1933 | Minor | 294/82.1 |
| 2,077,311 | A | * | 4/1937 | Darby | 43/42.16 |
| 2,281,831 | A | * | 5/1942 | Courvelle | 43/26.1 |
| 2,424,040 | A | * | 7/1947 | Long | 294/66.1 |
| 2,494,407 | A | * | 1/1950 | Rhodes | 43/42.16 |
| 2,498,612 | A | * | 2/1950 | Tackett | 43/37 |
| 2,500,477 | A | * | 3/1950 | Walker | 43/42.44 |
| 2,520,544 | A | * | 8/1950 | Hook | 294/82.1 |
| 2,589,435 | A | * | 3/1952 | Roeben | 43/43.4 |
| 2,625,005 | A | * | 1/1953 | Myers | 294/82.1 |
| 2,640,291 | A | * | 6/1953 | Garner | 43/44.82 |
| 2,708,999 | A | * | 5/1955 | Rush | 294/82.1 |
| 2,782,551 | A | * | 2/1957 | Raymond | 43/44.82 |

(Continued)

FOREIGN PATENT DOCUMENTS

| | | | | | |
|---|---|---|---|---|---|
| DE | | 3534003 A1 | * | 3/1987 | ............. A01K 83/00 |
| JP | | 02109931 A | * | 4/1990 | ............. A01K 83/00 |

(Continued)

*Primary Examiner* — Darren W Ark
(74) *Attorney, Agent, or Firm* — Michael D. Eisenberg

(57) ABSTRACT

A rotatable fish hook is configured for attachment to a legacy fishing lure. The rotatable fish hook may comprise: a barb; an attachment piece for connecting the hook to a fishing lure; and a rotation mechanism, configured to rotationally isolate the barb from the connecting piece. The barb is free to rotate while the attachment piece remains stationary. The rotatable fish hook may comprise: a shank and a bend connected to the shank at a first end and the shank connected to the barb at a second end. The rotation mechanism is configured to rotationally isolate the shank, the bend and the barb from the attachment piece. The shank, the bend and the barb are free to rotate while the attachment piece remains stationary.

8 Claims, 15 Drawing Sheets

(56) References Cited

U.S. PATENT DOCUMENTS

| | | | |
|---|---|---|---|
| 2,783,580 A * | 3/1957 | Balboni | 43/44.82 |
| 2,808,678 A * | 10/1957 | Leonardi | 43/44.82 |
| 3,092,412 A * | 6/1963 | Drake | 43/44.82 |
| 3,097,373 A * | 7/1963 | Wisti | 294/66.1 |
| 3,134,190 A * | 5/1964 | Triplett et al. | 43/44.82 |
| 3,205,607 A * | 9/1965 | Rossnan | 43/36 |
| 3,209,483 A * | 10/1965 | Malik | 43/44.82 |
| 3,222,814 A * | 12/1965 | Rossnan | 43/36 |
| 3,359,625 A * | 12/1967 | Rossnan | 29/436 |
| 3,550,303 A * | 12/1970 | Western | 294/66.1 |
| 3,751,844 A * | 8/1973 | Rossnan | 43/36 |
| 3,898,760 A * | 8/1975 | Klein | 43/44.83 |
| 3,964,202 A * | 6/1976 | Ruppa | 43/42.1 |
| 3,983,655 A * | 10/1976 | Kolesar | 43/42.1 |
| 4,130,961 A * | 12/1978 | Snow | 294/66.1 |
| 4,145,835 A * | 3/1979 | Snow | 294/66.1 |
| 4,403,437 A * | 9/1983 | Shuman | 43/36 |
| 4,702,507 A * | 10/1987 | Medendorp | 294/66.1 |
| 4,796,378 A * | 1/1989 | Krueger et al. | 43/43.2 |
| 5,199,209 A * | 4/1993 | Cook | 43/43.16 |
| 5,265,370 A * | 11/1993 | Wold | 43/44.82 |
| 5,425,195 A * | 6/1995 | Nakamichi | 43/44.82 |
| 5,524,385 A * | 6/1996 | Longo | 43/43.16 |
| 5,537,774 A * | 7/1996 | Muhammad | 43/43.16 |
| 5,664,365 A * | 9/1997 | Walden | 43/44.82 |
| 5,887,377 A * | 3/1999 | Birko | 43/42.41 |
| 6,035,798 A * | 3/2000 | Johnson | 114/299 |
| 7,895,789 B2 * | 3/2011 | Langer | 43/42.11 |
| D687,121 S * | 7/2013 | Hardwick | D22/134 |
| 8,550,518 B1 * | 10/2013 | Lucas | 43/43.16 |
| 2005/0284014 A1 * | 12/2005 | Cook | 43/43.16 |
| 2007/0169399 A1 * | 7/2007 | More et al. | 43/44.83 |
| 2009/0064564 A1 * | 3/2009 | Ingram | 43/42.36 |
| 2009/0090039 A1 * | 4/2009 | Ross | 43/44.82 |

FOREIGN PATENT DOCUMENTS

| | | | | |
|---|---|---|---|---|
| JP | 04166031 A | * | 6/1992 | A01K 83/00 |
| JP | 08037999 A | * | 2/1996 | A01K 83/00 |
| JP | 09294507 A | * | 11/1997 | A01K 83/00 |
| JP | 10210905 A | * | 8/1998 | A01K 83/00 |
| JP | 10276615 A | * | 10/1998 | A01K 83/00 |
| JP | 10295219 A | * | 11/1998 | A01K 83/00 |
| JP | 2001161239 A | * | 6/2001 | A01K 83/00 |
| JP | 2002306023 A | * | 10/2002 | A01K 83/00 |
| JP | 2004337147 A | * | 12/2004 | A01K 83/00 |
| JP | 2006141203 A | * | 6/2006 | A01K 83/00 |
| JP | 2006211962 A | * | 8/2006 | A01K 83/00 |
| JP | 2007222043 A | * | 9/2007 | A01K 83/00 |
| JP | 2008022798 A | * | 2/2008 | A01K 83/00 |

* cited by examiner

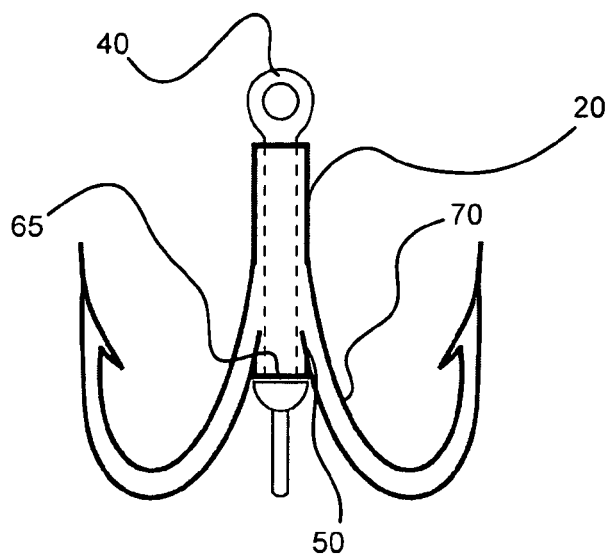
Fig. 3
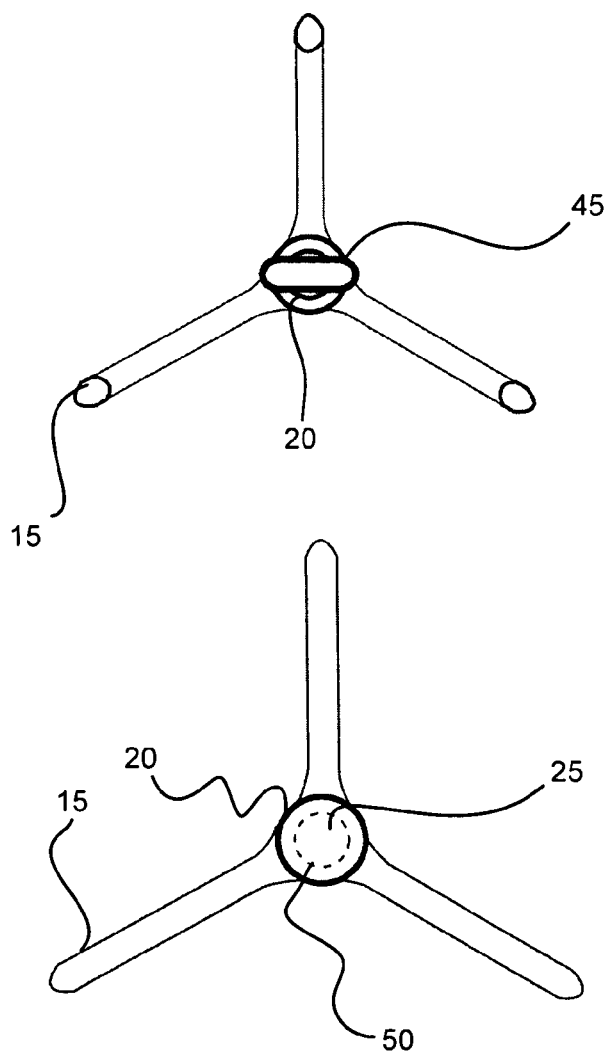
Fig. 4
Fig. 5

ROTATABLE FISH HOOK

CROSS-REFERENCES TO RELATED APPLICATIONS

This application claims priority from U.S. Provisional Application Ser. No. 61/139,558 filed Dec. 20, 2008, which is hereby incorporated herein by reference in its entirety.

TECHNICAL FIELD

The present invention relates to fishing hooks, and more particularly to a rotatable treble hook.

BACKGROUND OF THE INVENTION

A standard treble hook attaches to an O-ring connected to a fishing lure. The treble hook has limited ability to rotation before getting stuck either in a locked position or unable to rotate further, which causes the hook to tear out of a caught fish's mouth from leverage against the stopped hook. A prior art treble hook is shown in FIG. 10. To solve this problem a rotating treble hook would be able to spin freely to any direction the fish tends to fight and roll, which then eliminates the leverage which will improve the success rate hauling in a catch and reduce losing a caught fish. Also, in many instances when a fish is caught the first thing a fish will do is try and jump out of the water and shake its head to release a hook stuck in its mouth. However, with a rotating hook, when the fish shakes its head the hook will be able to swivel freely to either direction of the shake and the leverage that causes the hook to rip out of the fish's mouth is prevented. It would also be desirable, if one could use an existing lure with a hook that can freely rotate about the O-ring connected to the existing lure, thus avoiding the need to replace existing lures with newly configured lures. The present invention addresses this need.

BRIEF SUMMARY OF EMBODIMENTS OF THE INVENTION

According to one embodiment of the invention, a rotatable fish hook is provided.

In a variant, the rotatable fish hook comprises: a barb; an attachment piece for connecting the hook to a fishing lure; and a rotation mechanism configured to rotationally isolate the barb from the connecting piece. The barb is free to rotate while the attachment piece remains stationary.

In another variant, the rotatable fish hook comprises a shank and a bend connected to the shank at a first end. The bend is connected to the barb at a second end of the bend. The rotation mechanism is configured to rotationally isolate the shank, the bend and the barb from the attachment piece. The shank, the bend and the barb are free to rotate while the attachment piece remains stationary.

In a further variant of the rotatable fish hook, the rotation mechanism is disposed on the shank.

In still another variant of the rotatable fish hook, the rotation mechanism comprises a pin connected to the attachment piece in a rigid manner and a mating piece connected to the pin. The mating piece is configured to rotate independent of the pin. The matting piece and the pin may be configured as two pieces locked together by virtue of their mechanical configuration.

In yet a further variant of the rotatable fish hook, the mating piece comprises a channel configured to receive the pin. The pin is rotatable within the channel, and the channel has a first inner diameter along a portion of its cross section. The pin has at least a portion of its cross section wider than the first inner diameter of the channel so that the pin cannot move past the first inner diameter of the channel when the pin and the mating piece are pulled apart.

In another variant of the rotatable fish hook, the hook comprises a channel configured to receive the mating piece. The mating piece is rotatable within the channel, and the channel has a first inner diameter along a portion of its cross section. The mating piece has at least a portion of its cross section wider than the first inner diameter of the channel so that the mating piece cannot move past the first inner diameter of the channel when the pin and the mating piece are pulled apart.

In a further variant of the rotatable fish hook, the mating piece is the shank. The fish hook comprises a channel disposed through the shank. The channel has an opening at a top end and at a bottom end of the channel. The pin comprises a first end and a second end, and the pin is disposed within the channel. The second end protrudes out from the bottom end of the channel and is configured with a dimension larger than the opening of the channel at the bottom end of the channel to prevent the second end of the pin from entering the channel. The pin is rotatable within the channel and the attachment piece is configured to attach to an existing fishing lure.

In still another variant of the rotatable fish hook, the attachment piece is connected to the first end of the pin. The attachment piece has a dimension greater than the top opening of the channel to prevent the first end of the pin from entering the channel.

In yet a further variant of the rotatable fish hook, the fish hook is configured to replace a legacy fish hook on a fishing lure.

In another variant, the rotatable fish hook comprises a shank having a top subunit configured to attach to a fishing lure and a bottom subunit rotatably connected to the top subunit. A bend is connected to the bottom subunit and a barb is connected to the bend. The barb, the bend and the bottom subunit are free to rotate independent of the top subunit. The shank, the bend and the barb are free to rotate while the top subunit remains stationary.

In a further variant of the rotatable fish hook, the top subunit comprises an eyelet for connecting the fish hook to a fishing lure.

In still another variant of the rotatable fish hook, the top subunit comprises a first portion and a second portion. The first portion is wider in cross section than the second portion.

In yet a further variant of the rotatable fish hook, the first portion of the top subunit is wider in cross section than a cross section of the bottom subunit, and the second portion is narrower in cross section the cross section of the bottom subunit. The second portion is disposed within the bottom subunit.

In another variant of the rotatable fish hook, the bottom subunit comprises a third portion and a fourth portion. The third portion is wider in cross section than the first portion of the top subunit, and the first portion is disposed within the third portion. The fourth portion contains a hollow volume that is narrower in cross section than the second portion.

In a further variant of the rotatable fish hook, the second portion of the top subunit is disposed within the bottom subunit and abuts the fourth portion of the bottom subunit so that the top subunit cannot move past the fourth portion when the top and bottom subunits are pulled apart.

In still another variant of the rotatable fish hook, the bottom subunit is received into the top subunit.

In yet a further variant of the rotatable fish hook, the top subunit comprises a first hollow portion and a second hollow portion. The first hollow portion wider in cross section than the second hollow portion. The bottom subunit comprises a third portion and a fourth portion. The third portion wider in cross section than the fourth portion. The first hollow portion of the top subunit is wider in cross section than the third portion of the bottom subunit, and the second hollow portion is narrower in cross section than the third portion of the bottom subunit. The second hollow portion is wider in cross section than the fourth portion of the bottom subunit.

In another variant of the rotatable fish hook, the bottom subunit comprises a hollow portion, and at least a portion of the top subunit is disposed within the hollow portion.

In a further variant of the rotatable fish hook, the top subunit is configured to extend through the bottom subunit.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIG. 3 is a back view of a rotatable treble hook;

FIG. 4 is a top view of a rotatable fish hook;

FIG. 5 is a bottom view of the rotatable fish hook;

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 11:
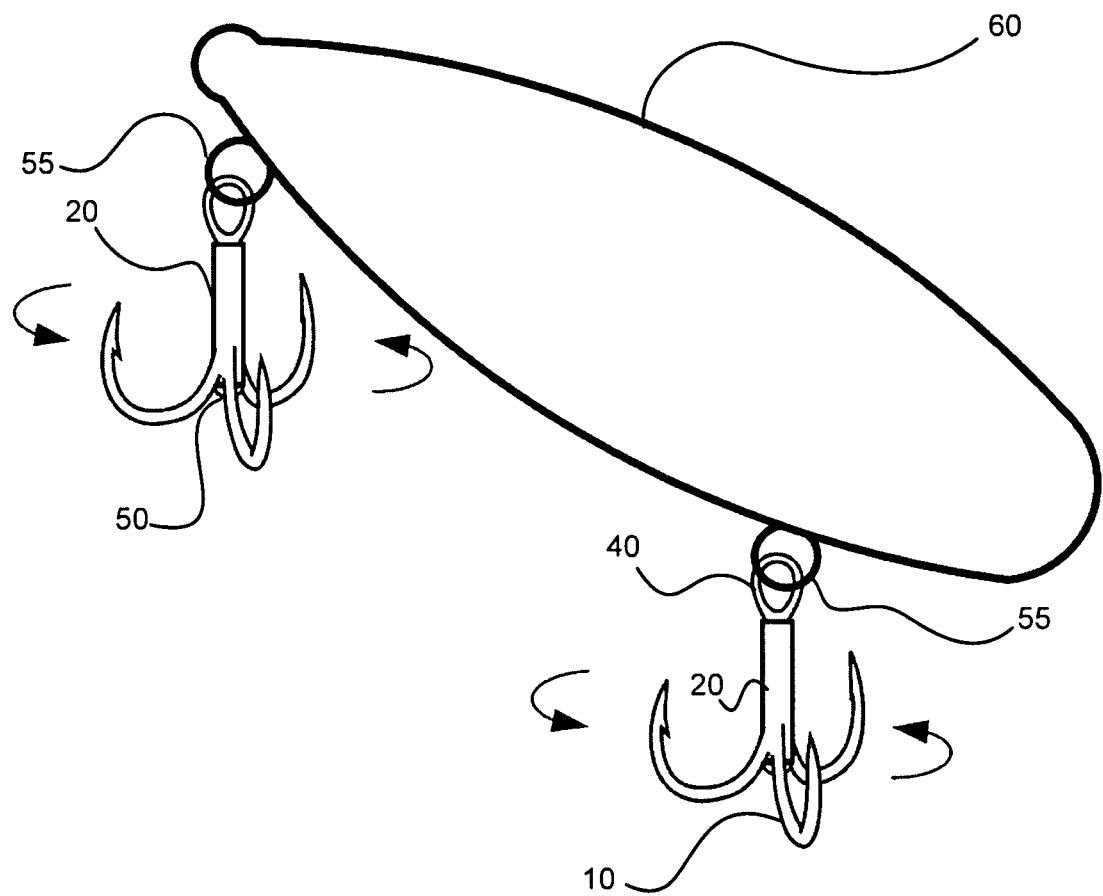
FIG. 11 is a legacy lure 60 having the rotatable fish hooks 10.

In one variant of the invention, referring to FIGS. 1-9, a rotatable treble hook 10 for fishing lures comprises three bends 12 having barbs 15 in the typical arrangement separated by 120 degrees. The hooks 15 are connected to a shaft 20 comprising a hollow interior 25. The shaft 20 has a bottom portion 28 that is disposed below a point 30 where the hooks 15 are joined to the shaft 20. A top portion 35 of the shaft 20 is disposed opposite the bottom portion 28. The hollow interior 25 portion of the shaft 20 is configured to house a pin 40 so that the pin 40 is rotatable inside the hollow interior 25 of the shaft 20. The pin 40 comprises a top 42 having a ring 45 and a bottom 43 comprising a mushroom shaped stop 50. The ring 45 has a cross section larger than that of a top opening 46 located at the top portion 35 of the shaft 20. The stop 50 has a cross section larger than an opening 48 disposed at the bottom portion 28 of the shaft 20. Thus, the stop 50 and the ring 45 prevent the pin 40 from sliding out of the shaft 40. Referring to FIG. 11, the ring 45 is configured to attached to an O-ring 55 of a legacy lure 60 or an existing lure 60. The O-ring 55 maybe constructed like that of a key chain ring.

Figure 8:
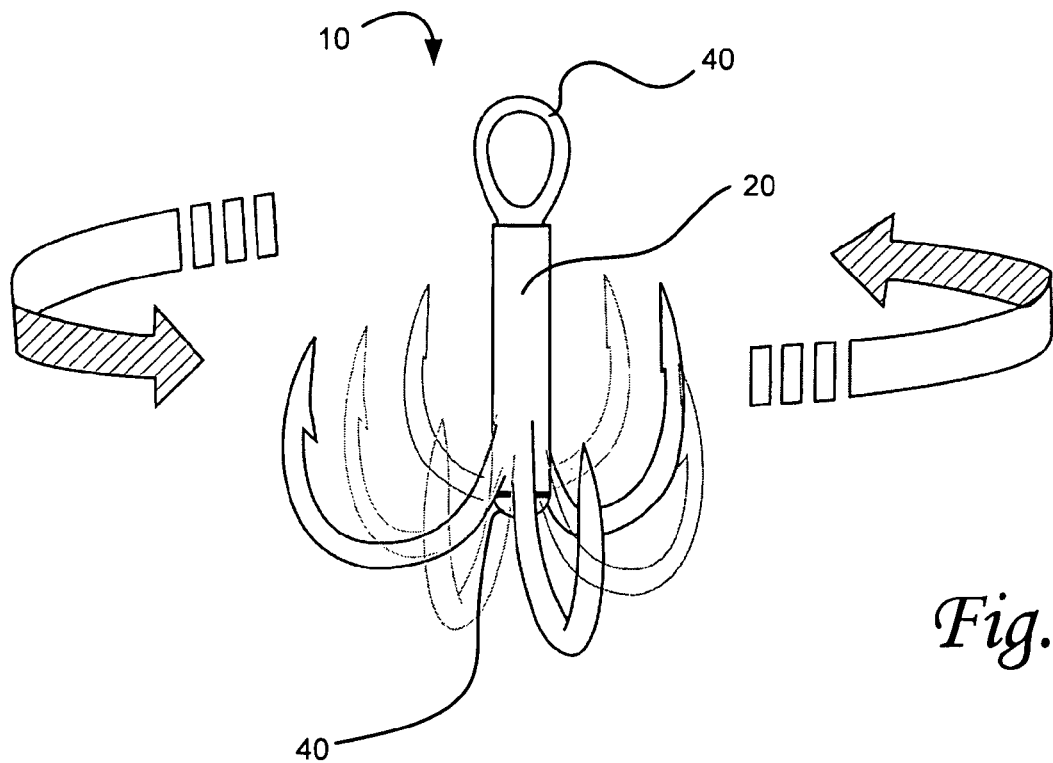
FIG. 8 is a perspective view illustrating the rotatable fish hook rotating.
Figure 9:
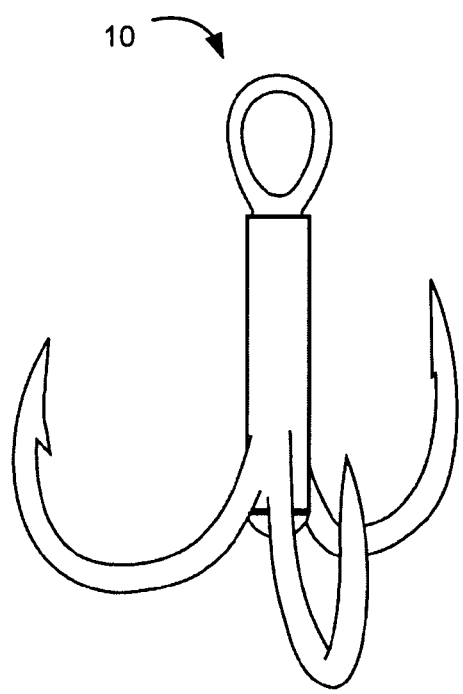
FIG. 9 is a perspective view illustrating the rotatable fish hook.

Referring to FIGS. 8 and 11, the rotatable fish hook 10 is configured so that the shaft 20 can rotate with the barbs 15 while the pin 40 remains stationary while connected to a legacy or existing fishing lure 60.

In a variant, referring to FIG. 3, a washer 65 is disposed between the mushroom shaped stop 50 and the bottom portion 28 of the shaft 20 to help decrease friction so that the hooks 15 spin freely.

Optionally, the barbs 15 and shaft 20 may together comprise a barb and shaft unit 70 that is rotatable about the pin 40. When the pin 40 is connected to an O-ring 55 of an existing lure 60, the barb and shaft unit 70 is free to rotate independent of the lure 60. This allows one to convert an existing lure 60 into one that has the advantages of a independently rotatable treble hooks. Thus, the fisherman does not need to purchase new lures.

Figure 1:
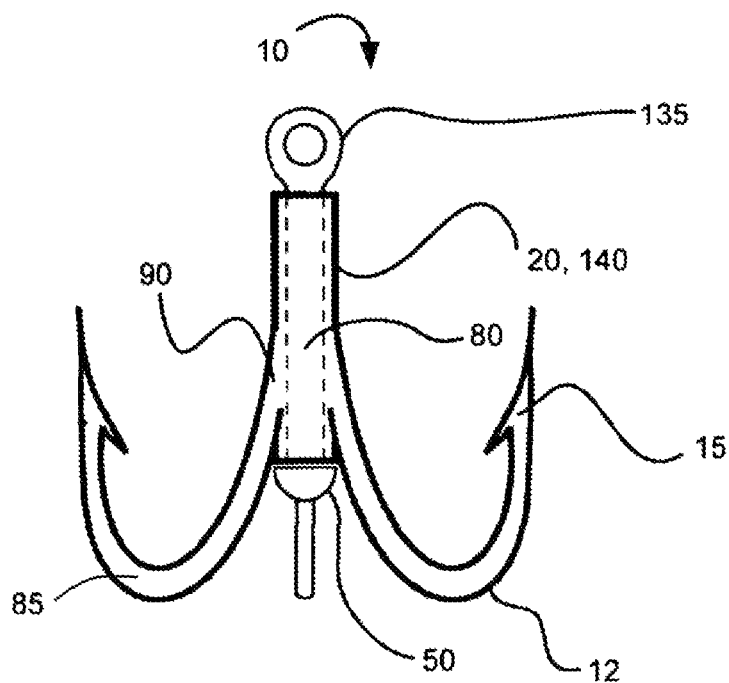
FIG. 1 is a front view of the rotatable treble hook in accordance with the principles of the invention.
Figure 2:
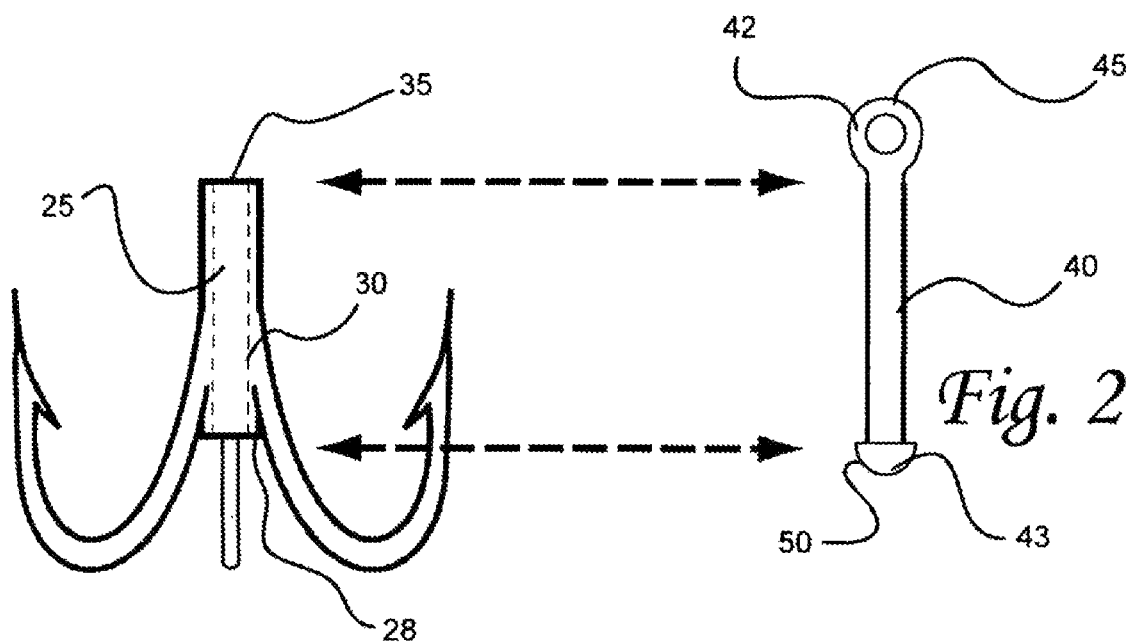
FIG. 2 is a diagram illustrating the pin 40 and the pin's 40 placement inside the shaft 20.
Figure 12:
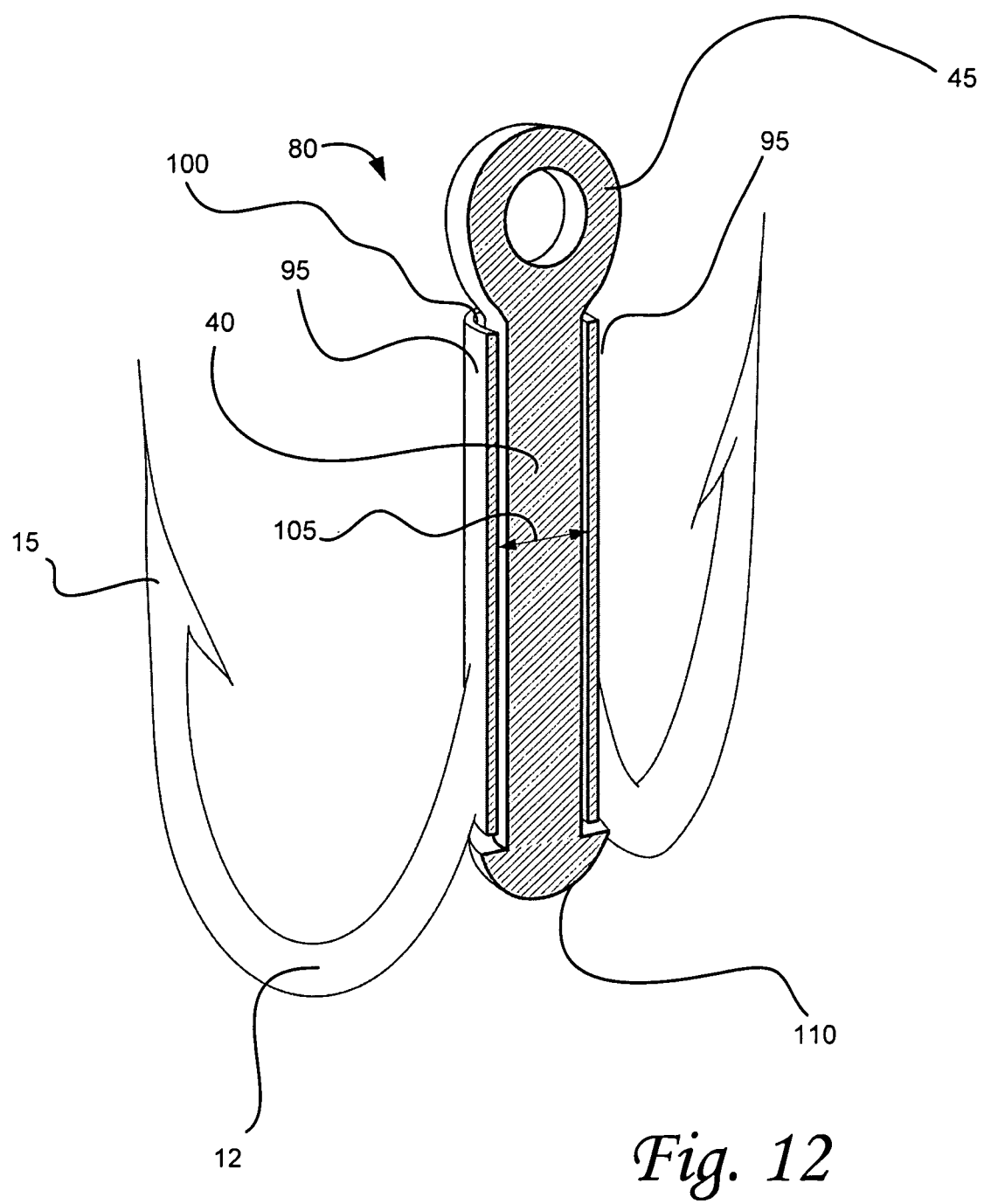
FIG. 12 is a sectional view of the rotatable fish hook.
Figure 13:
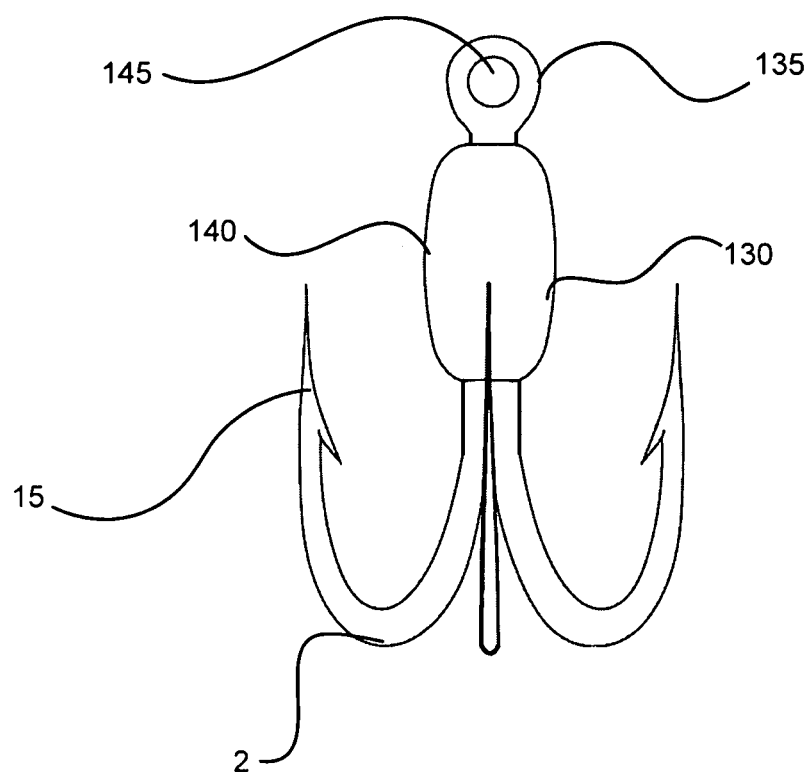
FIG. 13 is a front view of a variant of the rotatable fish hook.
Figure 14:
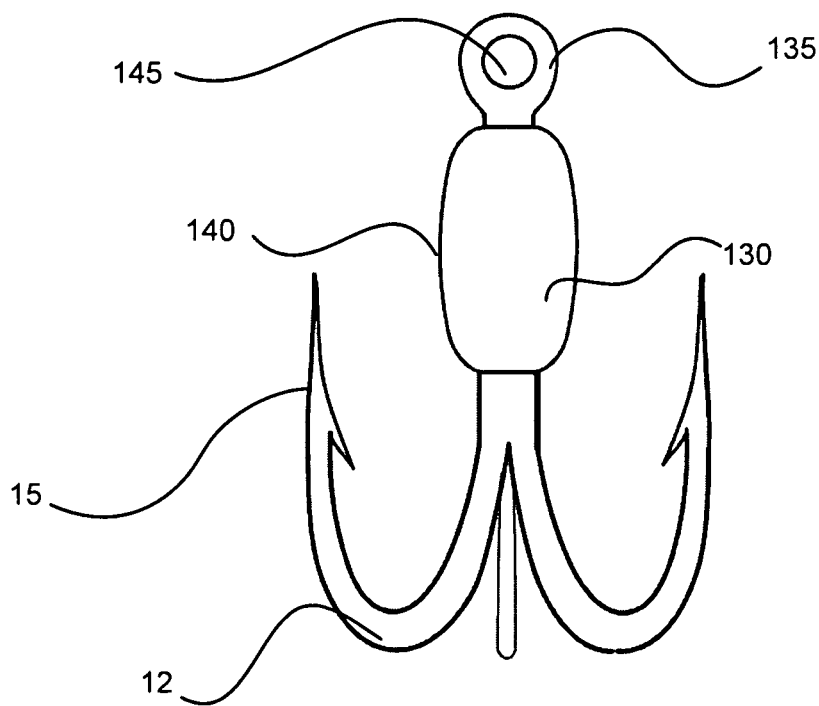
FIG. 14 is a back view of a variant of the rotatable fish hook.
Figure 15:
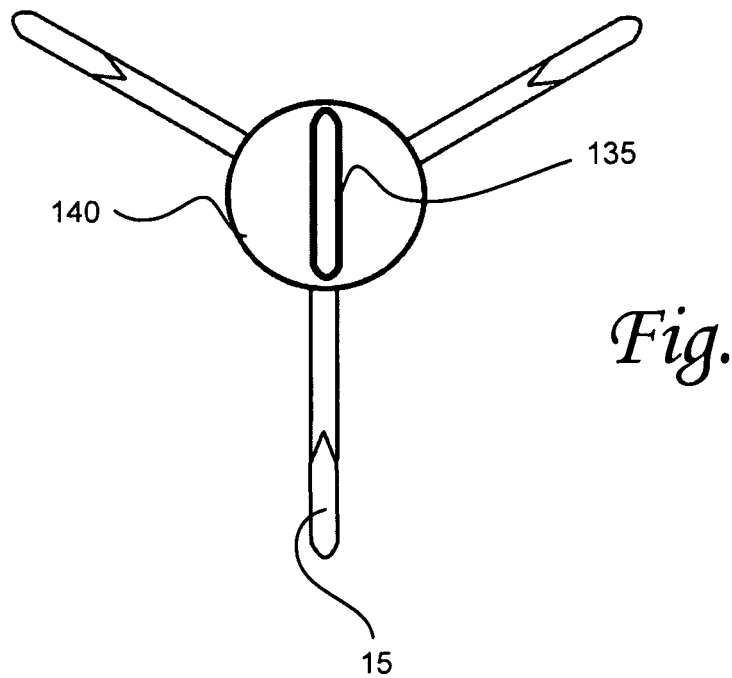
FIG. 15 is a top view of a variant of the rotatable fish hook.
Figure 16:
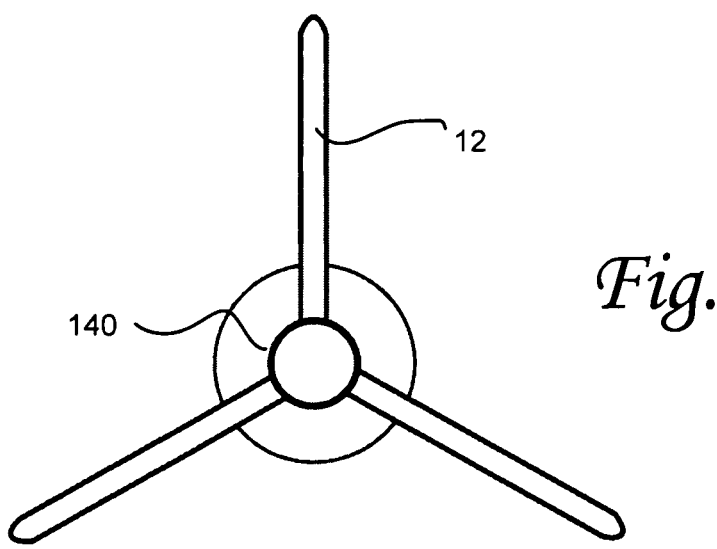
FIG. 16 is a bottom view of a variant of the rotatable fish hook.
Figure 17:
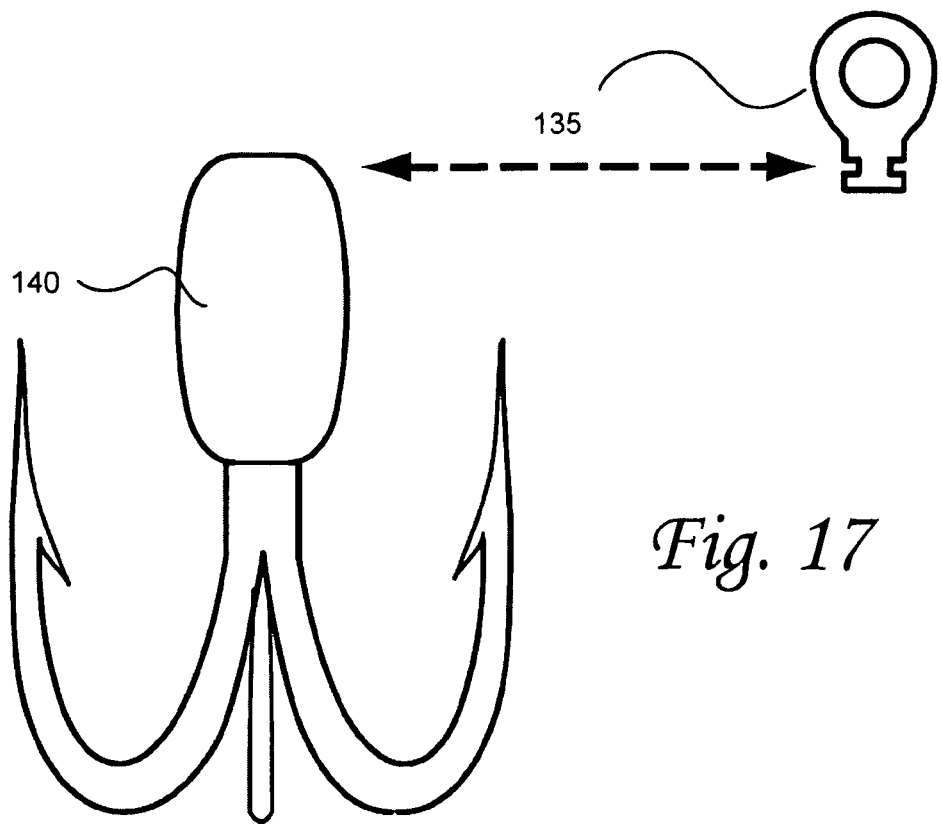
FIG. 17 is a diagram illustrating the relationship of the top subunit with the bottom subunit of a variant of the rotatable fish hook.

In another variant, the rotatable fish hook 10 comprises at least one barb 15. The fish hook 10 may have two or three barbs 15 as needed along with corresponding bends 12. An attachment piece 45 connects the hook to a fishing lure 60. Referring to FIGS. 1 and 12, a rotation mechanism 80 is configured to rotationally isolate the barb 15 from the attachment piece 45. The barb 15 is free to rotate while the attachment piece 45 remains stationary. Optionally, the attachment piece 45 comprises an eyelet 45.

In a further variant, referring to FIG. 1, the rotatable fish hook 10 comprises a shank 20 and a bend 12 connected to the shank 20 at a first end 85 of the bend 12. The bend 12 is connected to the barb 15 at a second end 90 of the bend. The rotation mechanism 80 is configured to rotationally isolate the shank 20, the bend 12 and the barb 15 from the attachment piece 45. The shank 20, the bend 12 and the barb 15 are free to rotate while the attachment piece 45 remains stationary.

In still another variant of the rotatable fish hook 10, the rotation mechanism 80 is disposed on the shank 20.

In yet a further variant of the rotatable fish hook 10, referring to FIG. 12, the rotation mechanism 80 comprises a pin 40 connected to the attachment piece 45 in a rigid manner. A mating piece 95 is connected to the pin 40 and is configured to rotate independent of the pin 40. The matting piece 95 and the pin 40 are configured as two pieces locked together by virtue of their mechanical configuration.

In another variant of the fish hook 10, referring to FIG. 12, the mating piece 95 comprises a channel 100 configured to receive the pin 40. The pin 40 is rotatable within the channel 100, and the channel 100 has a first inner diameter 105 along a portion of its cross section. The pin 40 has at least a portion 110 of its cross section wider than the first inner diameter 105 of the channel 100 so that the pin 40 cannot move past the first inner diameter 105 of the channel 100 when the pin 40 and the mating piece 95 are pulled apart.

Figure 22:
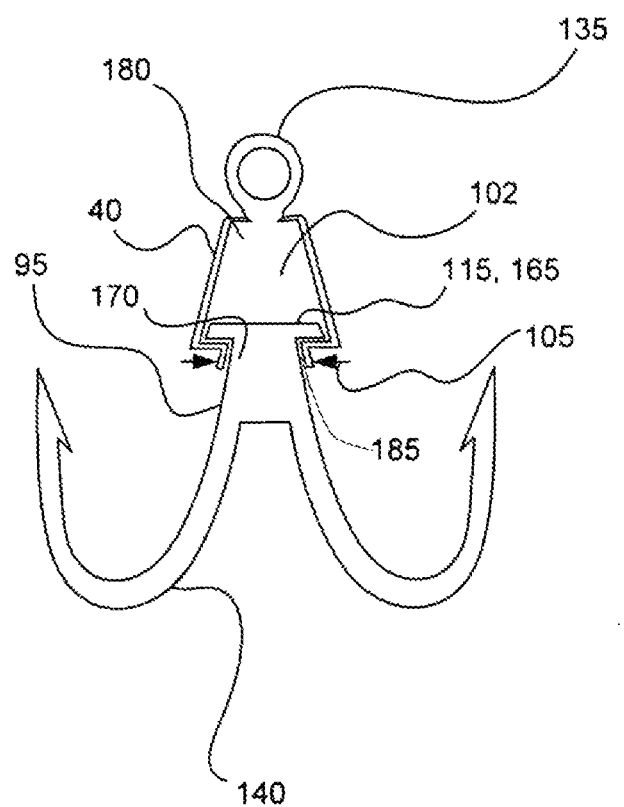
FIG. 22 is a cross sectional view of still another variant of the rotatable fish hook.

In a further variant of the fish hook 10, referring to FIG. 22, the hook 10 comprises a channel 102 configured to receive the mating piece 95. The mating piece 95 is rotatable within the channel 102, and the channel 102 has a first inner diameter 105 along a portion of its cross section. The mating piece 95 has at least a portion of its cross section 115 wider than the first inner diameter 105 of the channel 102 so that the mating piece 95 cannot move past the first inner diameter 105 of the channel 102 when the pin 40 and the mating piece 95 are pulled apart.

Figure 6:
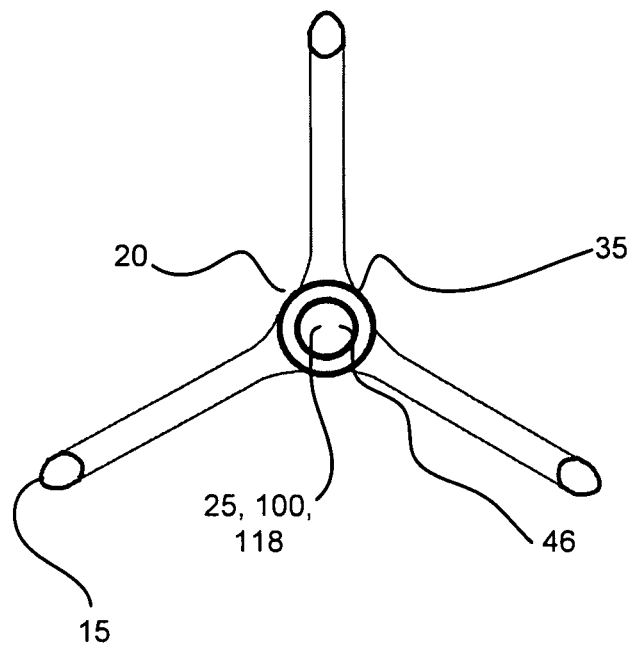
FIG. 6 is a top view of the rotatable fish hook 10 with the pin 40 removed.
Figure 7:
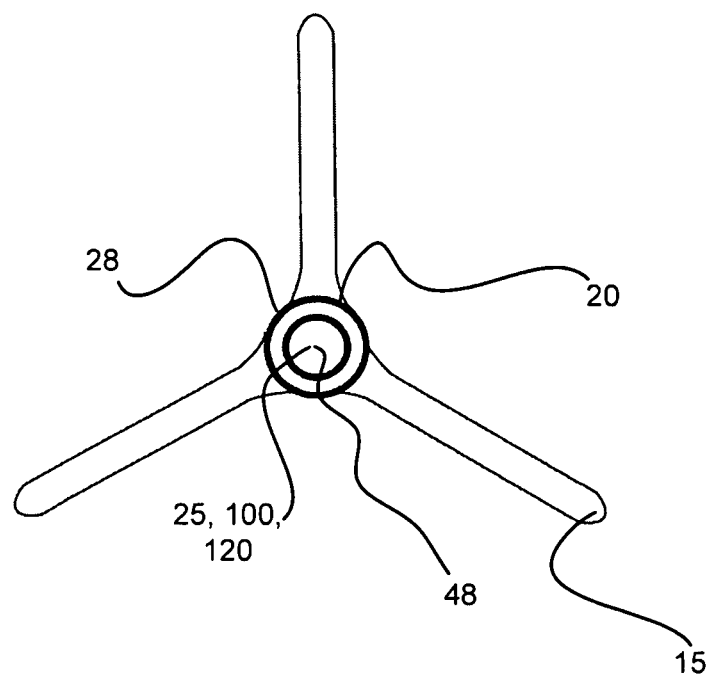
FIG. 7 is a bottom view of the rotatable fish hook 10 with the pin 40 removed.

In still another variant of the fish hook 10, referring to FIGS. 1, 6 and 7, the mating piece 95 comprises the shank 20. The fish hook 10 comprises a channel 100 disposed through the shank 20. The channel 100 has an opening 46 at a top end 118 and at a bottom end 120 of the channel 100. The pin 40 comprises a first end 42 and a second end 43. The pin is disposed within the channel 100 with the second end 43 protruding out from the bottom end 120 of the channel 100.

The second end 43 is configured with a dimension larger than the opening 48 of the channel at the bottom end 120 of the channel 100 to prevent the second end 43 of the pin 40 from entering the channel 100. The pin 40 is rotatable within the channel 100 and the attachment piece 45 is configured to attach to an existing fishing lure 60.

In yet a further variant of the fish hook 10, wherein the attachment piece 45 is connected to the first end 42 of the pin 40. The attachment piece 45 has a dimension greater than the top opening 46 of the channel 100 to prevent the first end 42 of the pin 40 from entering the channel 100.

Figure 10:
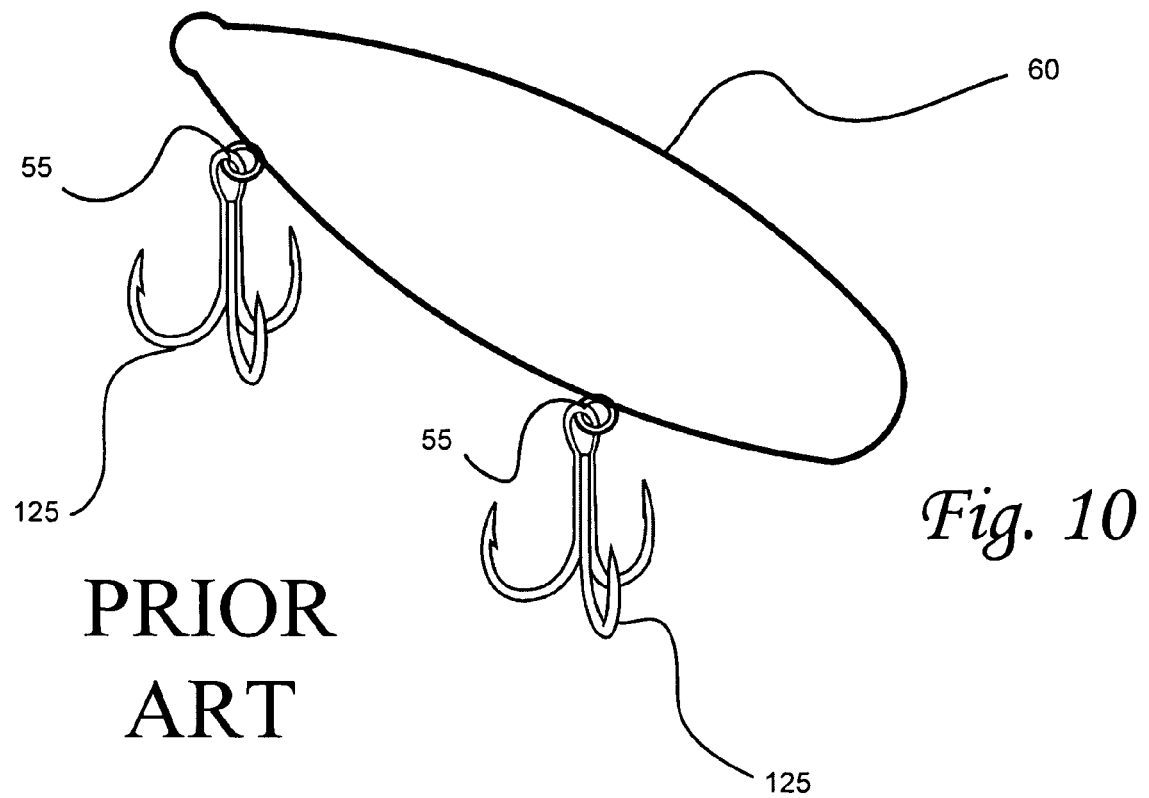
FIG. 10 is a legacy lure 60 having prior art fish hooks 80.

In another variant of the rotatable fish hook 10, referring to FIGS. 10 and 11, the fish hook 10 is configured to replace a legacy fish hook 125 on a fishing lure 60 via an O-ring 55.

Figure 18:
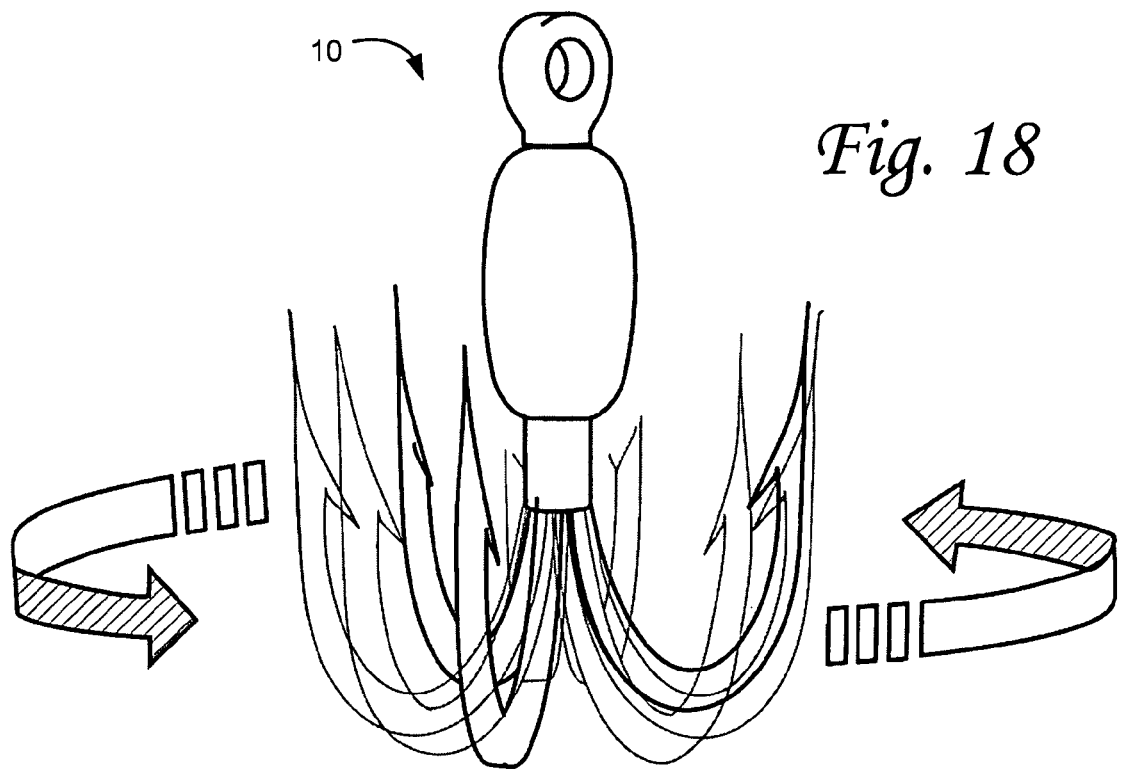
FIG. 18 is a perspective view illustrating a variant of the rotatable fish hook 10 rotating.

In a further variant, referring to FIGS. 13-19, a rotatable fish hook 10 comprises a shank 130. The shank 130 comprises a top subunit 135 configured to attach to a fishing lure 60 shown in FIG. 11. A bottom subunit 140 is rotatably connected to the top subunit 135. A bend 12 is connected to the bottom subunit 140 and at least one barb 15 is connected to the bend 12. The barb 15, the bend 12 and the bottom subunit 135 are free to rotate independent of the top subunit 135. As shown in FIGS. 8 and 18, the shank 130, the bend 12 and the barb 15 are free to rotate while the top subunit 130 remains stationary.

In still another variant of the rotatable fish hook 10, the top subunit 135 comprises an eyelet 145 for connecting the fish hook 10 to a fishing lure 60.

Figure 19:
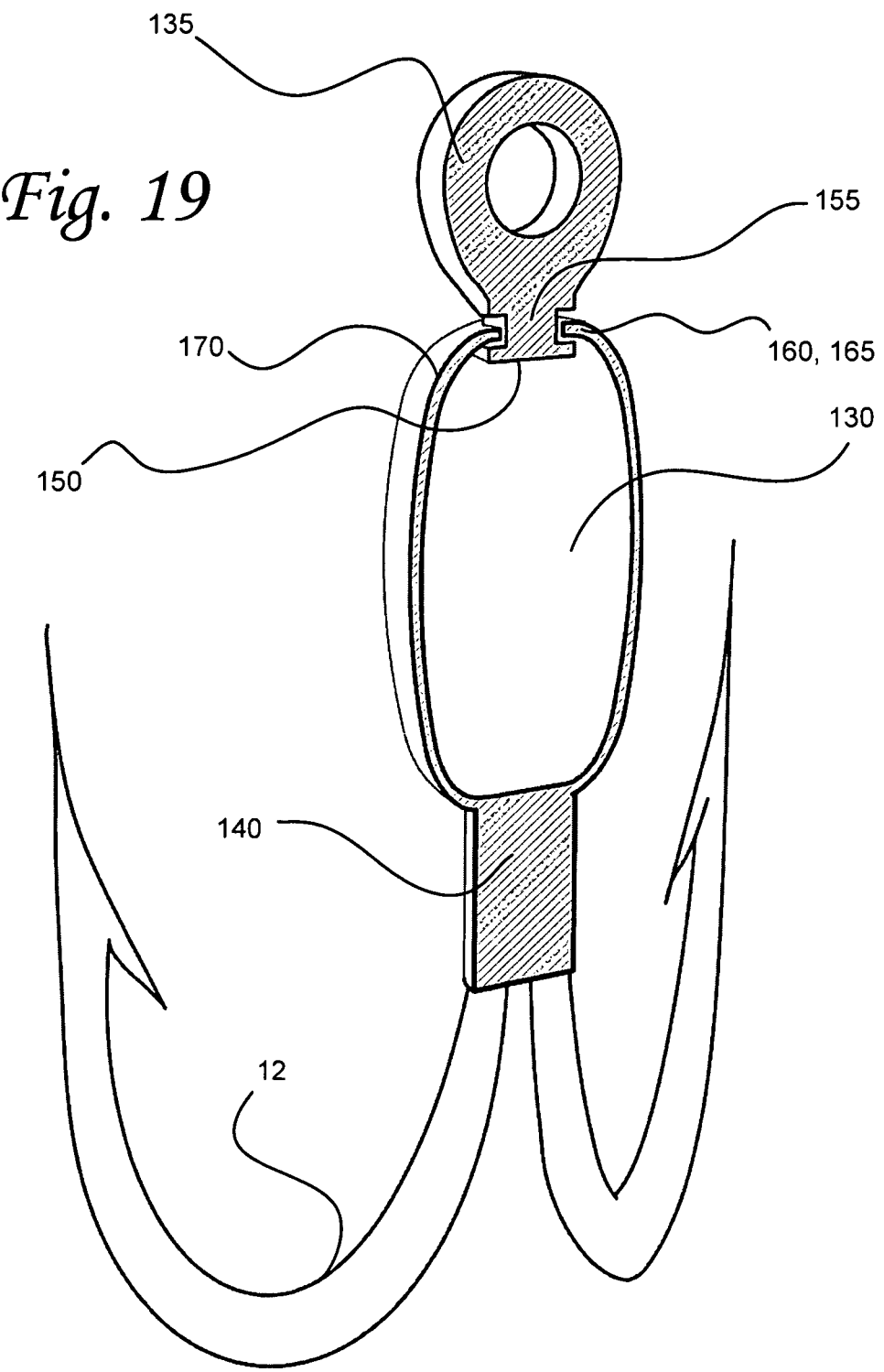
FIG. 19 a perspective view illustrating a variant of the rotatable fish hook.

In yet a further variant of the rotatable fish hook 10, referring to FIG. 19, the top subunit 135 comprises a first portion 150 and a second portion 155. The first portion 150 is wider in cross section than the second portion 155.

Figure 24:
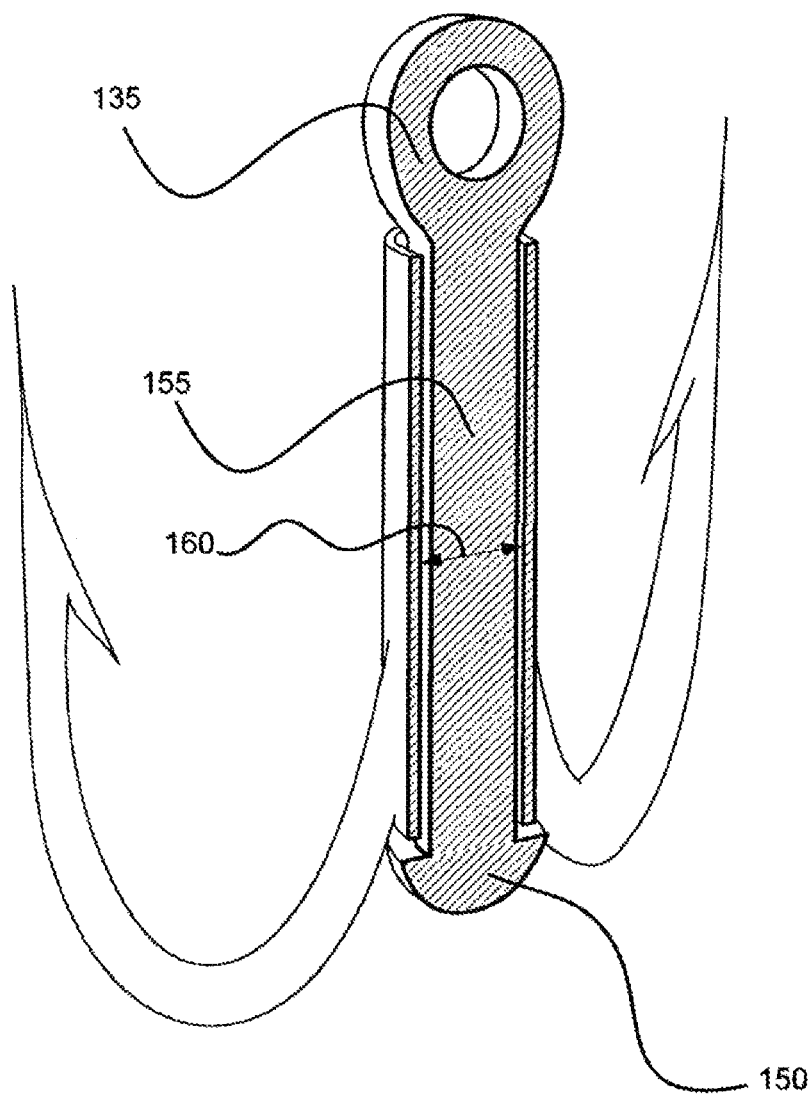
FIG. 24 is a cross sectional view of a rotatable fish hook in accordance with the principles of the invention.

In another variant of the rotatable fish hook 10, referring to FIG. 24, the first portion 150 of the top subunit 135 is wider in cross section that a cross section of the bottom subunit 140. The second portion 155 is narrower in cross section 160 than of the bottom subunit.

In a further variant of the rotatable fish hook 10, the bottom subunit 140 comprises a third portion 165 and a fourth portion 170. The third portion 165 is wider in cross section than the first portion 150 of the top subunit 135, and the first portion 150 is disposed within the third portion 165. The fourth portion 170 contains a hollow volume that is narrower in cross section than the second portion 155.

In still another variant of the fish hook, the second portion 155 of the top subunit 135 is disposed within the bottom subunit 140 and abuts the fourth portion 170 of the bottom subunit 140 so that the top subunit 135 cannot move past the fourth portion 170 when the top 135 and bottom 140 subunits are pulled apart.

In yet a further variant of the fish hook 10, referring to FIG. 22, the bottom subunit 140 is received into the top subunit 135.

In another variant of the rotatable fish hook 10, the top subunit 135 comprises a first hollow portion 180 and a second hollow portion 185. The first hollow portion 180 is wider in cross section than the second hollow portion 185. The bottom subunit 140 comprises a third portion 165 and a fourth portion 170. The third portion 165 is wider in cross section than the fourth portion 170. The first hollow portion 180 of the top subunit 135 is wider in cross section than the third portion 165 of the bottom subunit 140. The second hollow portion 185 is narrower in cross section than the third portion 165 of the bottom subunit. The second hollow portion 185 is wider in cross section than the fourth portion 170 of the bottom subunit 140.

Figure 21:
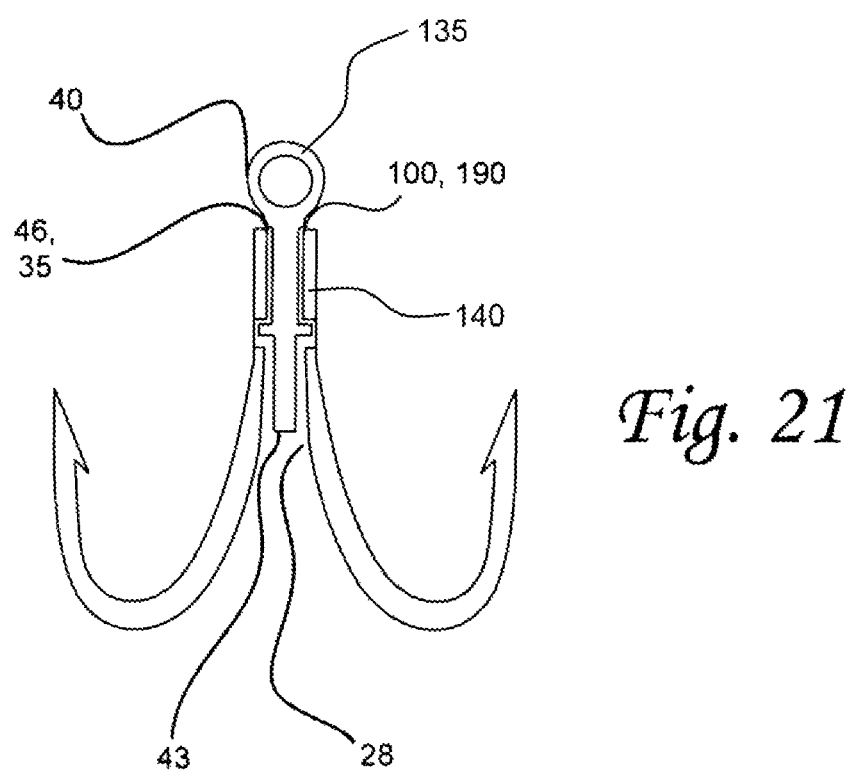
FIG. 21 is a cross sectional view of a further variant of the rotatable fish hook.

In a further variant of the fish hook 10, referring to FIG. 21 the bottom subunit 140 comprises a hollow portion 190, and at least a portion of the top subunit 135 is disposed within the hollow portion 190.

In still another variant of the fish hook 10, referring to FIG. 1, the top subunit 135 is configured to extend through the bottom subunit 140.

Figure 23:
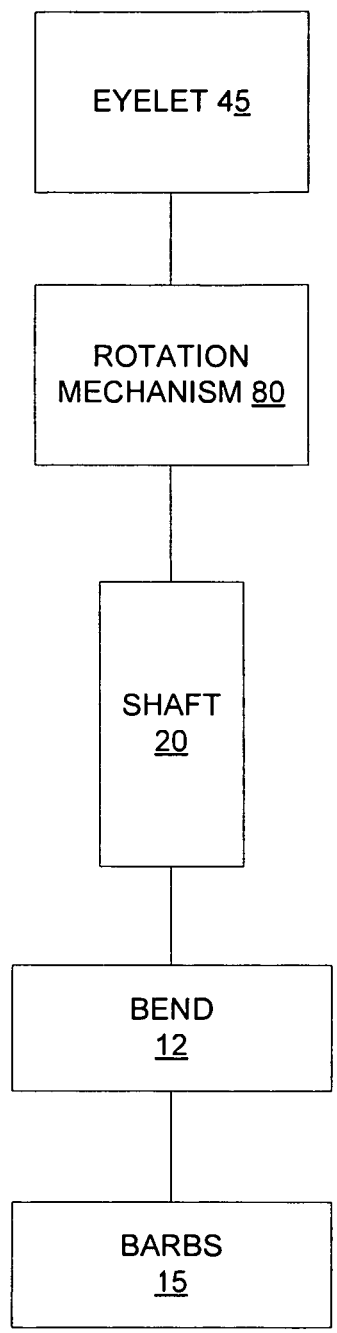
FIG. 23 is a block diagram of the rotatable fish hook.

Referring to FIG. 23, a rotatable fish hook 10 comprises an eyelet 45 for connection to a fishing lure 60. The eyelet 45 is connected to a rotation mechanism 80 for rotationally isolating the eyelet 45 from a shaft 20 that is connected to a bend 12 which is connected to one or more barbs 15.

Figure 20:
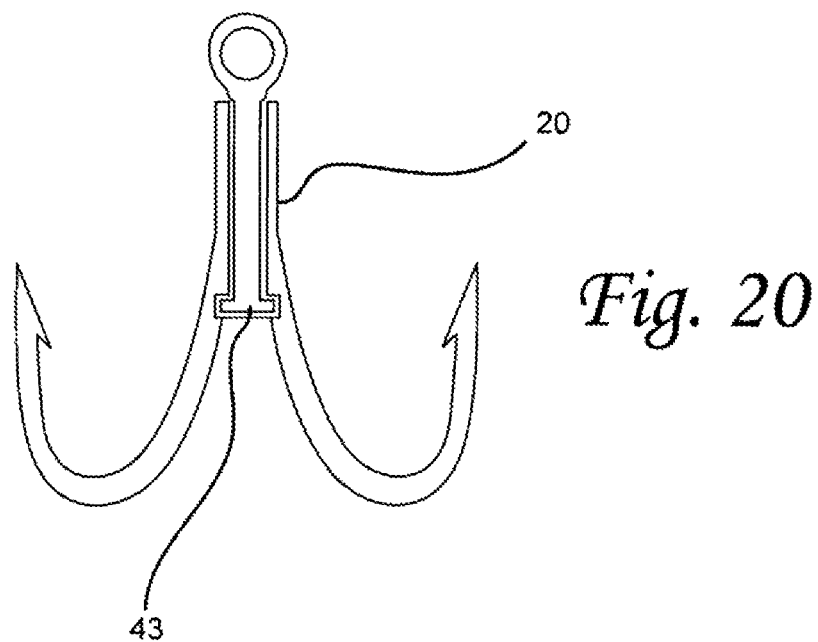
FIG. 20 is cross sectional view of another variant of the rotatable fish hook.

Alternate configurations of a rotatable fishing hook 10 can be implemented. For example, in FIGS. 21 and 22, the mechanism for preventing the pin 40 from becoming disconnected from the shaft 20 can be configured anywhere along the pin 40. FIG. 21 illustrates the mechanism in the middle of the pin 40. The bottom 28 of the shaft may be open or closed as in FIG. 20.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A rotatable fish hook, comprising:
  a barb;
  a shaft having a length and a channel disposed through the length of the shaft, the channel having an opening at a top end thereof and an opening at a bottom end of the channel, the bottom end being flat and extending in a plane perpendicular to a longitudinal axis of the channel;
  a bend having a first end connected to the shaft and the bend having a second end connected to the barb;
  an attachment piece for connecting the hook to a fishing lure and having an axis of rotation; and
  a rotation mechanism, configured to rotationally isolate the shaft, the bend and barb from the attachment piece, wherein the rotation mechanism comprises:
    a pin connected to the attachment piece in a rigid manner and which shares the axis of rotation of the attachment piece, and the pin connected to the shaft, the channel of the shaft having a larger inner dimension than an outer dimension of the pin, the shaft configured to rotate independent of the pin, the pin comprising a first end and a second end and a longitudinal axis extending therebetween, and the pin being disposed within the channel, the second end of the pin protruding out from the bottom end of the channel and configured with a dimension larger than the opening of the channel at the bottom end of the channel to prevent the second end of the pin from entering the channel, the second end of the in terminating at a flat surface having a curved surface extending therefrom, the flat surface both extending transversely with respect to the longitudinal axis of the in and facing both the first end of the in and the opening at the bottom end of the channel, the curved surface extending away from the flat surface and the opening at the bottom end of the channel, and the pin being rotatable within the channel;

wherein the shaft, the bend and the barb being free to rotate about the pin while the attachment piece remains stationary, and the shaft, bend and barb have an axis of rotation that is constrained to be permanently collinear with the axis of rotation of the attachment piece and the pin.

2. A rotatable fish hook of claim 1, wherein the first end of the bend is connected to the shaft above the opening at the bottom end of the channel.

3. A rotatable fish hook, comprising:
a barb;
a shaft having a length, an outside surface and an inside surface which defines a channel disposed through the length of the shaft, the channel having an opening at a top end and an opening at a bottom end of the channel, the bottom end being flat and extending in a plane perpendicular to a longitudinal axis of the channel;
a bend having a first end connected to the outside surface of the shaft without contacting the inside surface of the shank and the bend having a second end connected to the barb;
an attachment piece for connecting the hook to a fishing lure; and
a rotation mechanism, configured to rotationally isolate the shank, the bend and barb from the attachment piece, wherein the rotation mechanism comprises:
a pin connected to the attachment piece in a rigid manner and the pin connected to the shaft, the channel of the shaft having a larger inner dimension than an outer dimension of the pin, the shaft configured to rotate independent of the pin, the pin comprising a first end and a second end and a longitudinal axis therebetween, and the pin being disposed within the channel, the second end of the pin protruding out from the bottom end of the channel and configured with a dimension larger than the opening of the channel at the bottom end of the channel to prevent the second end of the pin from entering the channel, the second end of the in terminating at a flat surface having a curved surface extending therefrom, the flat surface both extending transversely with respect to the longitudinal axis of the in and facing both the first end of the in and the opening at the bottom end of the channel, the curved surface extending away from the flat surface and the opening at the bottom end of the channel, and the pin being rotatable within the channel;
wherein the shaft, the bend and the barb being free to rotate about the pin while the attachment piece remains stationary, and the shaft, bend and barb have an axis of rotation that is constrained to be permanently collinear with the axis of rotation of the attachment piece and the pin.

4. A rotatable fish hook, comprising:
a barb;
a shaft having a length, an outside surface and an inside surface which defines a channel disposed through the shaft, the channel having an opening at a top end thereof and an opening at a bottom end of the channel, the bottom end being flat and extending in a plane perpendicular to a longitudinal axis of the channel;
a bend having a first end connected to the outside surface of the shaft without contacting the inside surface of the shaft above the opening at the bottom end of the channel and the bend having a second end connected to the barb;
an attachment piece for connecting the hook to a fishing lure; and
a rotation mechanism, configured to rotationally isolate the shaft, the bend and barb from the attachment piece, wherein the rotation mechanism comprises:
a pin connected to the attachment piece in a rigid manner and the pin connected to the shaft, the channel of the shaft having a larger inner dimension than an outer dimension of the pin, the shaft configured to rotate independent of the pin, the pin comprising a first end and a second end and a longitudinal axis extending therebetween, the pin being disposed within the channel, the second end of the pin protruding out from the bottom end of the channel and configured with a dimension larger than the opening of the channel at the bottom end of the channel to prevent the second end of the pin from entering the channel, the second end of the in terminating at a flat surface having a curved surface extending therefrom, the flat surface both extending transversely with respect to the longitudinal axis of the pin and facing both the first end of the pin and the opening at the bottom end of the channel, the curved surface extending away from the flat surface and the opening at the bottom end of the channel, and the pin being rotatable within the channel;
wherein the shaft, the bend and the barb free to rotate about the pin while the attachment piece remains stationary.

5. The rotatable fish hook of claim 4, wherein the attachment piece is connected to the first end of the pin, and the attachment piece has a dimension greater than the top opening of the channel to prevent the first end of the pin from entering the channel.

6. The rotatable fish hook of claim 4, wherein the fish hook is configured to replace a legacy fish hook on a fishing lure.

7. The rotatable fish hook of claim 4, wherein the channel is disposed through the length of the shaft.

8. The rotatable fish hook of claim 4, wherein the shaft is positioned concentrically with respect to the pin and is configured to rotate concentrically about the pin.

* * * * *